United States Patent [19]

Corsmeier

[11] 3,966,357
[45] June 29, 1976

[54] BLADE BAFFLE DAMPER
[75] Inventor: Robert J. Corsmeier, Cincinnati, Ohio
[73] Assignee: General Electric Company, Cincinnati, Ohio
[22] Filed: Sept. 25, 1974
[21] Appl. No.: 509,031

[52] U.S. Cl. .............................. 416/97 R; 416/500
[51] Int. Cl.² ............................................. F01D 5/18
[58] Field of Search ............................. 416/96–97, 416/500

[56] References Cited
UNITED STATES PATENTS

| | | | |
|---|---|---|---|
| 2,144,428 | 1/1939 | Martin | 416/500 |
| 2,568,726 | 9/1951 | Franz | 416/90 |
| 2,783,023 | 2/1957 | Stalker | 416/500 |
| 2,862,686 | 12/1958 | Bartlett | 416/500 X |
| 2,873,944 | 2/1959 | Wiese et al. | 416/96 |
| 3,644,060 | 2/1972 | Bryan | 416/97 |
| 3,700,348 | 10/1972 | Corsmeier et al. | 416/97 |
| 3,715,170 | 2/1973 | Savage et al. | 416/97 |
| 3,867,068 | 2/1975 | Corsmeier et al. | 416/97 |

FOREIGN PATENTS OR APPLICATIONS

| | | | |
|---|---|---|---|
| 891,635 | 3/1944 | France | 416/500 |
| 981,599 | 5/1951 | France | 416/500 |
| 940,226 | 4/1956 | Germany | 416/500 |

Primary Examiner—Everette A. Powell, Jr.
Attorney, Agent, or Firm—Dana F. Bigelow; Derek P. Lawrence

[57] ABSTRACT

The impingement baffle insert of a turbomachinery blade is provided with a collar around a portion thereof, the collar having a chamfered surface on the radially inner end and adapted to be frictionally engaged by a damper which also surrounds a portion of the insert and which tends to move radially outward over the beveled surface when acted on by centrifugal forces caused by rotation of the blade. The damper is thus wedged between the insert and the blade inner wall to reduce or prevent relative movement therebetween which is normally caused by thermal and vibrational forces. The integrity of the combination is thus improved to reduce the incidence of insert and turbine blade failure.

6 Claims, 5 Drawing Figures

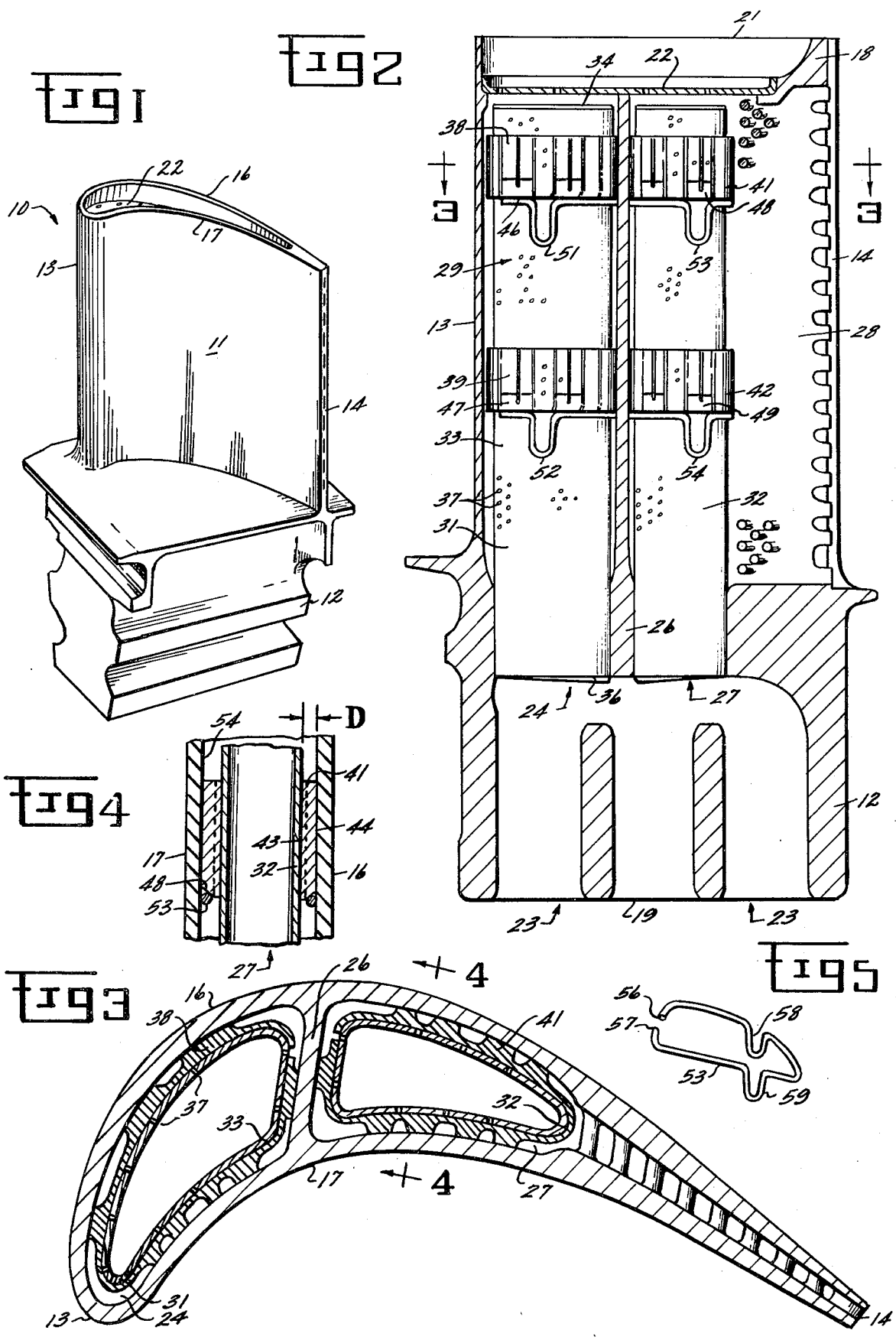

BLADE BAFFLE DAMPER

BACKGROUND OF THE INVENTION

This invention relates generally to turbomachinery blading and, more particularly, to an air-cooled turbine blade or stator nozzle having an impingement baffle disposed therein for impinging cooling air on the internal blade airfoil wall. The invention herein described was made in the course of or under a contract, or a subcontract thereunder, with the United States Department of the Air Force.

In order to obtain satisfactory performance of gas turbine engines it has been necessary to increase the maximum turbine operation temperatures to levels which are significantly higher than the melting point of available blade materials. Consequently, high pressure turbine blades of all modern gas turbines must necessarily be cooled to lower temperatures to enable them to perform their functions for a required engine life. A common method by which the blades are cooled is to bleed air from the compressor and deliver it to the turbine either internally of the engine through passageways formed by the turbine and compressor rotor shafts and discs or through piping mounted externally of the engine.

One of the most effective methods of cooling turbine rotor blades and turbine stator nozzles is that of impinging cooling air on the inner walls thereof by means of an impingement baffle inserted into the hollow airfoil. The impingement baffle which is formed in substantially the same shape as the inside of the airfoil is spaced from the airfoil inner walls by a distance commonly known as the impingement distance. Cooling air is forced into the internal recess of the baffle, and then passes through a plurality of small holes in the baffle walls to impinge on the internal walls of the airfoil in a high velocity rate, thereby resulting in high efficiency cooling of the blade airfoils.

The impingement distance is critical in the design of the combination to the extent that the proper airflow distribution and velocity is desired. A common method of controlling the impingement distance is to form a plurality of dimples which protrude outwardly from the baffle walls and frictionally engage the inner walls of the blade. In addition to establishing impingement distance, the dimples also serve to position and support the baffle. A problem arises, however, when the dimples begin to wear thin because of vibration and thermal movement of the insert. Since the baffles are composed of a material which is necessarily light in weight, exhibits high strength capabilities, and is resistant to high temperatures, they tend not to demonstrate good wear characteristics. The integrally formed dimples in the baffles have a minimal contact area and, consequently, tend to wear thin resulting in fatigue cracks which creep from the thin dimple surface to a point of failure in the baffle.

It is, therefore, an object of this invention to provide a turbomachine blade which will operate in an environment of high temperature and high speed movement without resultant failure.

Another object of this invention is to provide a turbine blade baffle insert which is not susceptible to significant vibrational movement within the turbine blade cavity.

A further object of this invention is the provision for a turbine blade insert which is economical to manufacture, effective in use and extremely functional in use.

These objects and other features and advantages will become more readily apparent upon reference to the following description when taken in conjunction with the appended drawings.

SUMMARY OF THE INVENTION

Briefly, in accordance with one aspect of the invention, a damper spring is installed on the impingement baffle so as to interact with the means by which the insert is positioned within the blade chamber, to reduce the vibrational movement of the insert during operational rotation of the blade. Relative position of the insert with respect to the blade inner walls is established and maintained by one or more spacing elements affixed to the periphery of the insert. The spacing elements have a chamfered surface on the radially inward edge, against which the damper spring is positioned. When the blade is rotated, centrifugal force acts on the spring to move it radially outward over the chamfered surface to wedge tightly between the spacing element and the chamber inner wall to reduce or substantially prevent any significant relative movement between the insert and the blade.

In another aspect of the invention, the spacing element comprises a collar surrounding a portion of the insert and having its entire radially inward edge chamfered to react with the spring damper element.

In yet another aspect of the invention, the damper element is attached at one end thereof to the collar, with the other end thereof being free to radially move across the chamfered surface. An alternative is to have both ends attached to the collar and an expansion loop included proximate the middle portion of the damper spring so as to allow that portion to move radially over the beveled surface.

In the drawings as hereinafter described, a preferred embodiment is depicted; however, various other modifications and alternate constructions can be made thereto without departing from the true scope and spirit of the invention.

BRIEF DESCRIPTION OF THE DRAWINGS

FIG. 1 is a perspective view of a turbine blade of the type which employs an internally disposed impingement baffle of the present invention;

FIG. 2 is a side elevational view thereof drawn in partial section and to an enlarged scale, to show the features of the present invention;

FIG. 3 is a cross-sectional view of a turbine blade as seen along lines 3—3 of FIG. 2 in accordance with the preferred embodiment of the invention;

FIG. 4 is a partial sectional view of the turbine blade as seen along the line 4—4 of FIG. 3; and FIG. 5 is a perspective view of the damper portion of the preferred embodiment of the invention.

DESCRIPTION OF THE PREFERRED EMBODIMENT

Referring now to the drawings wherein like numerals correspond to like elements throughout, reference is initially made to FIG. 1 wherein a turbine blade is indicated generally at 10 as comprising an airfoil portion 11 and an attachment or root portion 12 adapted to secure the blade, in a well-known manner, to a turbine rotor (not shown), with the airfoil portion 11 extending radially across the motive fluid flow passage. The airfoil portion 11 includes a leading edge 13 and a chordwise spaced trailing edge 14 which are interconnected by convex and concave side wall portions 16 and 17, respectively. The airfoil portion 11 is suitably shaped in a well-known manner so as to efficiently extract energy from the motive fluid as it flows spanwise of the blade to thereby impart rotary motion to the rotor.

Referring to FIG. 2, the blade structure of this invention is preferably formed of a hollow, cast member 18 having an open inner end 19 and an outer or distal end 21. The outer end 21 is closed by a tip cap 22 which may be cast integrally with the member 18 or suitably secured thereto as by welding or brazing. The root or attachment portion 12 is provided with a plurality of plenums or receiving chambers 23, for receiving a flow of suitable cooling fluid through the open inner end 19. A leading edge chamber 24 extends longitudinally of the airfoil portion 11 and is cooperatively formed by the cast member 18, a central rib portion 26, and the tip cap 22. Similarly, a midspan chamber 27 extends longitudinally of the airfoil portion 11 and is cooperatively formed by the rib portion 26, the cast member 18, a trailing edge portion 28 of the cast member 18, and the tip cap 22.

In order to provide efficient cooling for the leading edge 13 and the convex and concave wall portions 16 and 17, respectively, means designated generally at 29 are provided in flow communication with the cooling fluid of the chamber 23 for impinging cooling fluid against certain portions of the inner walls of the cast member 18 as a plurality of high velocity jets. The impingement means 29 preferably comprises a pair of thin-walled, tubular inserts, or impingement baffles, 31 and 32 which are disposed in chambers 24 and 27, respectively, with their walls lying in close spaced relationship to the chamber walls. For purposes of description, the impingement inserts 31 and 32 should be considered as similar in basic construction and, to avoid repetition, only the insert 31 will be described as comprising closed wall 33, an outer or distal end 34, and an open end 36, in flow communication with the cooling fluid receiving chambers 23. The closed wall 33 is preferably composed of a thin, lightweight material having a plurality of small openings or perforations 37 formed therein and through which the cooling fluid is expanded and impinged against the chamber wall as a plurality of high velocity fluid jets.

Insertion of the impingement baffles into the blade chambers is commonly accomplished by placing the insert in the blade cavity from the outer end 21 by removal of the end cap 22, and securing it therein by firmly affixing the inner end 36 thereof, as by welding or brazing to the cast member 18 proximate the fluid chambers 23, as is shown in FIG. 2.

In addition to the securing of the impingement baffle within the blade cavities, as discussed hereinabove, it is also necessary to properly locate them within the cavity so as to obtain the proper cooling fluid distribution and velocity of flow. The means by which the present invention accomplishes this function is by way of a spacing element or a plurality of spacing elements disposed in close fit relationship between the outer walls of the impingement baffles 31 and 32 and the inner walls of the blade chambers 24 and 27. The spacing element is preferably of a light material and of a size which does not restrict the impinging function of the insert, but yet one which provides the necessary spacing around the entire surface of the impingement baffle. A preferred spacing element is that shown in FIGS. 2 and 3 comprising a collar or a plurality of collars surrounding the impingement baffle and frictionally engaging the walls of the inner chambers 24 of the blade. The embodiment of the present invention as shown in FIGS. 2 and 3 includes upper and lower longitudinally spaced collars 38 and 39, respectively, applied to the insert 31 and similar upper and lower collars 41 and 42 similarly applied to the insert 32. It should be recognized that various other alternative spacing element arrangements may also be used in keeping with the scope of this invention. For example, a single large collar may be disposed at the central portion of the insert, or a greater number of collars may be longitudinally spaced along the insert. Alternatively, the spacing element may take the form of a plurality of pads located on the periphery of the insert in no particular pattern, but having for their function the provision for proper spacing around the entire wall surface of the insert. This critical spacing between the insert and the chamber wall, commonly known as the impingement distance, is indicated by the dimensional letter D in FIG. 4. Yet another method by which this function may be accomplished is by the prior art method of integral dimples extending outwardly from the periphery of the insert.

In addition to providing for the proper impingement distance as described hereinabove, the spacing elements also act to prevent direct frictional wear to the insert as it is caused to move within the baffle chambers by reason of thermal vibrations and centrifugal forces. Referring to FIGS. 3 and 4, the collar 41 is similar to collars 38, 39 and 42 and is adapted to surround the insert 32 with its inner side 43 contiguous with the periphery thereof. Its outer side 44 is adapted to be disposed in a close fit relationship within the chamber 27, so as to maintain the position of the insert within the chamber and not allow any significant movement therein. More significantly, the collar 41 acts to maintain the impingement distance around the entire wall surface of the insert and prevent any friction between the chamber walls and the insert itself. Composition of the collar is preferably of a material hard enough so that it is not significantly eroded by frictional wear against the chamber walls, and yet of a composition which allows it to be exposed to high temperatures without significant thermal expansion or deformation. Further, the collars are preferably composed of a material whose shape is easy to conform to the insert periphery, and one which can be rigidly attached to the periphery by welding or brazing or the like.

It should be understood that the spacing element of this invention is not limited to a collar structure, but may take any of a number of forms including a plurality of dimples formed on the insert periphery as taught by the prior art design. However, in keeping with the design of the present invention it is preferred that the wear element have a beveled surface on the radially inward side thereof to provide a gradual transition between the periphery of the insert and the outermost portion of the wear element. The interrelationship of the damper element of the present invention with the beveled surface of the spacer element will be more clearly seen as the preferred embodiment is more specifically developed hereinafter.

Referring to the preferred embodiment of FIGS. 2 and 4, the collars 38, 39, 41 and 42 have chamfered surfaces formed on the radially inward ends thereof designated by the numerals 46, 47, 48 and 49, respectively. The chamfered surface can be more clearly seen by reference to FIG. 4 wherein the surface 48 is shown as being angled at a substantially but not necessarily 45° angle with the blade chamber inner wall 54. The damper 53 is disposed between those two surfaces in such a manner as to have a portion thereof which is free to move toward the apex of the angle and thereby stabilize the interrelationship between the collar and the chamber inner wall. This movement of the damper is caused by centrifugal force acting thereon when the rotor blade is rotated in the conventional manner. The dampers 51, 52, 53 and 54 are attached in a similar manner so as to interact with their respective collars to attain the same results.

A preferred embodiment of the damper 53 is shown in FIG. 5 wherein it comprises a substantially cylindrically formed wire loop which conforms to the shape of the insert and terminates at the ends 56 and 57. The damper may be merely clipped onto the insert with the ends 56 and 57 being in close proximity such that the spring substantially surrounds the insert and the entire damper is free to move radially outward along the insert chamfered edge when acted upon by centrifugal force. However, it is preferred for manufacturing and assembling purposes that one or both of the ends 56 and 57 are affixed to the collar by a conventional method such as by welding or brazing. If both ends are attached, it may be necessary, and if only one is attached it may be desirable, to provide one or more expansion loops in the damper wire to allow the damper to expand as it moves along the beveled surface of the collar. A pair of loops 58 and 59 are provided in the preferred embodiment of this invention as shown in FIG. 5. It will, of course, be understood that there are other modifications and alternate constructions that can be made to the damper without departing from the true spirit and scope of this invention. For example, the damper may have a plurality of successive loops formed therein so as to give a ripple-like appearance, or, if at least one of the ends is free, it may be a smooth, continuous wire without any loops. As another example, the cross section of the damper may take a form which is different from a circular form as shown, or the total length of the damper may be varied so as to enclose only certain portions of the blade insert.

Having thus described the invention what is claimed as novel and desired to be secured by Letters Patent of the United States is:

I claim:

1. An improved turbomachinery blade of the type having a hollow cavity defining an internal wall surface, a cooling insert adapted to be positioned within said cavity, and means for delivering coolant to the interior of said insert, wherein the improvement comprises:

spacing means disposed between said insert and said wall surface, said spacing means having a beveled portion which forms an acute angle with said wall surface; and a vibration damper positioned between said insert and said internal wall surface, said damper adapted to move radially outward over said beveled portion when acted on by centrifugal force to wedge between said spacing means and said internal wall surface so as to substantially preclude motion of said insert within said cavity during rotation of the blade.

2. An improved turbomachinery blade as set forth in claim 1 wherein said spacing means comprises a wear collar adapted to surround a portion of said insert and further wherein said beveled portion is on the radially inward side of said wear collar.

3. An improved turbomachinery blade as set forth in claim 1 wherein said damper comprises a wire adapted to have at least a portion thereof movable in the radially outward direction with respect to said insert when acted upon by centrifugal force.

4. An improved turbomachinery blade as set forth in claim 3 wherein at least one end of said damper wire is connected to said insert.

5. An improved turbomachinery blade as set forth in claim 4 wherein said damper wire includes a loop portion for the allowance of expansion of said damper wire.

6. An insert for use with a hollow turbomachinery blade comprising:

an elongated baffle member adapted to be placed within the hollow blade said baffle member being hollow and having a plurality of impingement holes formed therein;

spacing means disposable between said baffle member and said blade for accurately positioning said baffle member with respect to the inner wall surface of the blade said spacing means having a beveled portion which forms an acute angle with said wall surface; and a vibration damper positioned between said baffle member and said inner wall surface, said damper adapted to move radially outward over said beveled portion when acted on by centrifugal force to wedge between said spacing means and said inner wall surface so as to substantially preclude panel motion vibration of said baffle member.

\* \* \* \* \*